United States Patent Office.

SAMUEL E. CARR, OF DANVILLE, PENNSYLVANIA.

Letters Patent No. 83,037, dated October 13, 1868.

IMPROVED COMPOSITION FOR FORMING BUILDING-BLOCKS, PAVEMENTS, TILES, &c.

The Schedule referred to in these Letters Patent and making part of the same.

To all whom it may concern:

Be it known that I, SAMUEL E. CARR, of Danville, in the county of Montour, and State of Pennsylvania, have invented a new and improved Composition for Building-Blocks, Pavement-Tiles, &c.; and I do hereby declare that the following is a full, clear, and exact description thereof, which will enable others skilled in the art to make and use the same, reference being had to the accompanying drawing, forming part of this specification, in which—

Figure 1 is a perspective view of one of my improved building-blocks.

Figure 2 is a cross-section of the same.

Figure 3 is a perspective view of one of my improved pavement-tiles.

Similar letters of reference indicate like parts.

My invention has for its object to furnish an improved composition for forming building-blocks, pavement-tiles, and for other similar purposes, which shall be cheap and durable, forming a hard and permanent structure; and it consists in the composition formed of the ingredients, and in the proportions and manner hereinafter more fully described.

In preparing this composition, I take of sand, either raw, or well burned, or coked, (I prefer the latter,) seventeen parts, ($\frac{17}{20}$;) hydraulic, Rosedale, or equivalent cement, two parts, ($\frac{2}{20}$;) and plaster, or plaster of Paris, one part, ($\frac{1}{20}$.)

The ingredients are thoroughly mixed together while dry, and are then moistened or wet, for moulding, in a solution of sulphate of zinc, in the proportion of one pound of sulphate of zinc to one thousand blocks or bricks of ordinary size, dissolved in sufficient lime-water to saturate the mixture.

In the case of pavement-tiles, one part ($\frac{1}{20}$) of the sand may be replaced with ground slate, and one part of the cement may be replaced with mineral paint, the other proportions of the ingredients remaining the same, and the composition being prepared in the same manner.

If desired, one part ($\frac{1}{20}$) of black lead, for facing, may be added to the mixture.

Having thus described my invention,

I claim as new, and desire to secure by Letters Patent—

An improved composition for forming building-blocks, pavement-tiles, &c., formed of the ingredients, and in the proportions and manner substantially as herein set forth and described.

SAMUEL E. CARR.

Witnesses:
JOHN DELONG,
FRANKLIN RESSLER.